Figure 1:
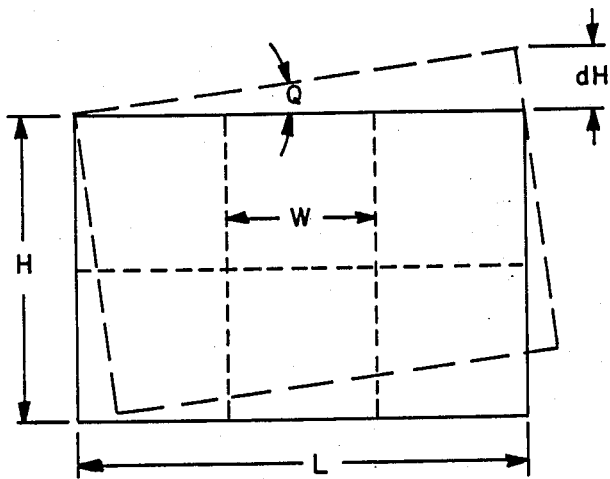

United States Patent [19]

Kermisch

[11] Patent Number: 4,637,057
[45] Date of Patent: Jan. 13, 1987

[54] ROTATION OF DIGITAL IMAGES

[75] Inventor: Dorian Kermisch, Penfield, N.Y.

[73] Assignee: Xerox Corporation, Stamford, Conn.

[21] Appl. No.: 635,869

[22] Filed: Jul. 30, 1984

[51] Int. Cl.$^4$ ............................................. G06K 9/32
[52] U.S. Cl. ...................................... 382/46; 340/727
[58] Field of Search ..................... 382/46; 340/727; 358/22, 183; 364/731

[56] References Cited

U.S. PATENT DOCUMENTS 4,000,486 12/1976 Schomburg ..................... 340/172.5
4,271,476 6/1981 Lotspiech ............................ 364/515

OTHER PUBLICATIONS

IBM Technical Disclosure Bulletin, vol. 17, No. 10, Mar. 1975.

IBM Technical Disclosure Bulletin, vol. 18, No. 8, Jan. 1976.

*Primary Examiner*—Anthony V. Ciarlante
*Attorney, Agent, or Firm*—R. F. Chapuran

[57] ABSTRACT

The image is divided into regions of a given number of pixels. The original image is scaled down by a given factor. Each region of pixels is then enlarged in order to overlap its neighboring region. The enlarged regions are then sequentially written down in a scaled down version, in overlapped relationship, with each region oriented a given degree with respect to its neighboring region. The end result is a rotated image that has the same size as the original image with no gaps between neighboring oriented regions. This method applies to any arbitrary angle, as well as, to images defined as an arbitrary number of bits per pixel.

4 Claims, 3 Drawing Figures

ROTATION OF DIGITAL IMAGES

This invention relates to digital images, and in particular, to the fast, arbitrary rotation of digital images, using interpolation.

Prior systems such as shown in IBM Technical Disclosure Bulletin Vol. 17, No. 10, March 1975, and Vol. 18, No. 8, January 1976 disclose the use of shift registers for image orientation. Other systems such as shown in U.S. Pat. No. 4,000,486 describe a page memory access control having a plurality of registers associated with rows on a page to be printed. U.S. Pat. No. 4,271,476 shows a method for rotating images having a horizontal scan format into a vertical scan format. The digital image is divided into a plurality of sections, the scan direction of each section is rotated in sequence, and then the rotated sections are combined.

Another method of rotation is shown in an article in IEEE Transactions on Computers, July 1972, titled "A Fast Computer Method for Matrix Transposing". In particular, the article teaches a mathematical theory for rotation of matrices. However, by definition, the transposing of matrices is limited to a 90° rotation. In general, this is a difficulty with prior art methods of rotation. They are not readily adapted to the rotation of images through various angles.

Other methods of image rotation are known. For example, U.S. Ser. No. 547,199, filed Oct. 31, 1983 now U.S. Pat. No. 4,545,069, teaches a method of rotating digital images by dividing the image into horizontal regions of equal size that can be manipulated in computer memory. Each region is rotated separately and a scratch file is produced containing the rotated regions in sequence. In a series of steps, the rotated regions are progressively doubled in size until one region includes the entire rotated image.

In another method, it is known to rotate an image with nearest neighbor interpolation for small angle rotation. However, as the angle of rotation increases, there are limitations. In particular, the size of the rotated image increases, and a set of artifacts become visable (i.e. for each displaced region, there is one pixel in the rotated image not covered by the region). In addition, not any arbitrary angle can be obtained with blocks of uniform size. Another difficulty with prior art systems in addition to the limitations on the size of angles of rotated images is the relative lack of speed of rotation.

Accordingly, it is an object of the present invention to provide a new and improved means to manipulate digital images. It is another object of the present invention to be able to perform relatively fast rotation of images through various angles of rotation. Further advantages of the present invention will become apparent as the following description proceeds, and the features characterizing the invention will be pointed out with particularity in the claims annexed to and forming a part of this specification.

Briefly, the image is divided into regions of a given number of pixels. The original image is scaled down by a given factor. Each region of pixels is then enlarged in order to overlap its neighboring region. The enlarged regions are then sequentially written down in a scaled down version, in overlapped relationship, with each region oriented a given degree with respect to its neighboring region. The end result is a rotated image that has the same size as the original image with no gaps between neighboring orientated regions. This method applies to any arbitrary angle, as well as, to images defined as an arbitrary number of bits per pixel.

Figure 2:
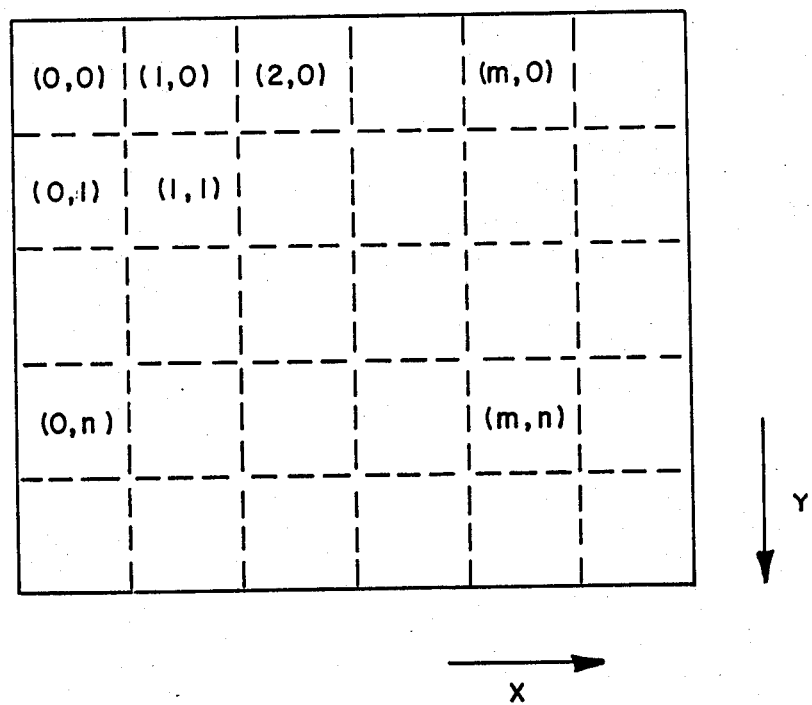
Figure 3:
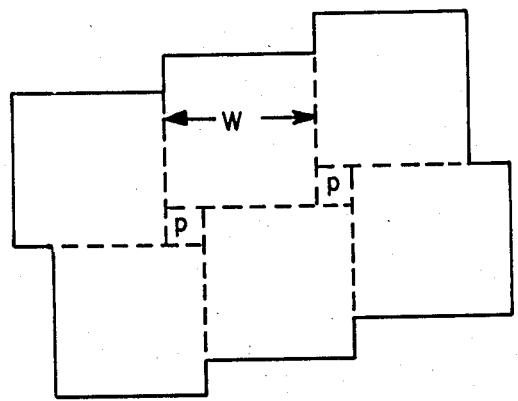

For a better understanding of the invention, reference is made to the following detailed disclosure of the invention taken in conjunction with the accompanying drawings wherein:

FIG. 1 illustrates an image to be rotated;
FIG. 2 illustrates the notation for blocks of pixels; and
FIG. 3 illustrates a basic method of rotation.

One method of rotation is to denote by L and H respectively the horizontal and vertical dimensions of the image to be rotated by an angle Q, as seen in FIG. 1. Assume the rotation to be around the upper left corner. The upper right corner is displaced in the vertical direction by dH=L sin Q pixels. For small angles, it can be assumed that the corner moves straight upwards.

Divide the image into square blocks of lateral dimension W, where W=L/dH. For simplicity, assume that W is an integer. The image consists of dH rows of blocks, with dH blocks in each row.

Denote by (m,n) the mth block in the nth row, and by $X_{mm}$ and $Y_{mm}$ the coordinates of the upper left corner of the (m,n) block, with $X_{00}=Y_{00}=0$ as seen in FIG. 2. These are the coordinates of the block. Assume that the X axis extends to the right and the Y axis extends downwards. The values belonging to, respectively, the original and rotated images are further denoted by S and D.

The rotation is obtained by moving the rotated blocks with respect to each other as seen in FIG. 3. The coordinates of the first block in each row can be found from the previous block by the expressions.

$$SX_{o,n+1} = SX_{0n}, \quad (1)$$

$$SY_{o,n+1} = SY_{o,n} + W,$$

$$SX_{m+1,n} + = SX_{mn+w},$$

$$SY_{m+1,n} = SY_{m,n}.$$

$$DX_{o,n+1} = DX_{0n} - A(n + 1),$$

$$DY_{o,n+1} = DY_{o,n} + W,$$

$$DX_{m+1,n} = DX_{mn} + W,$$

$$DY_{m+1,n} = DY_{m,n} + A(m + 1),$$

where $A(k)=1$ for clockwise rotation and $A(k)=-1$ for counterclockwise rotation.

While the previous method works well for small angles, it does not for larger angles. It changes the size of the rotated image by a factor of 1/cos Q and it cannot work for all angles. For example, for a rotation of 45°, the size of the blocks is one pixel, and next available block size, of two pixels, generates an angle of about 26°.

To allow any rotation angle between 0° and ±45°, define dH equal to L tan Q. and the block dimension D as being the integer part of L/dH. Hence, for example, rotations of 45° and of 30° generate the same number of blocks. If all the blocks are displaced, with respect to the previous block, by one pixel, as in the previous Equations, for both cases, a 45° rotation is obtained.

If N blocks per horizontal row are to be moved, the displacement of the upper right corner will be N pixels. If a displacement of only dH, is desired some of the A(k) elements in the previous Equations are made zero.

For this purpose, use the following algorithm to set the values of A(k) before starting to move the blocks,

```
Y ← N/2;
FOR i IN [1..Max] DO
Y ← Y + dH;
IF Y > = N THEN {A [i] ← a; Y ← Y − N;} ELSE A [i] ← O;
ENDLOOP;
```

In the above algorithm, Max is the largest of the image dimensions and a is 1 for clockwise rotation and −1 for counterclockwise rotation.

The rotated image is larger by a factor 1/cos Q than the original image, and its new length is defined by $L_m$. To correct for this fact conceptually, the size of the original image can be reduced by this factor. An often used method for reducing one bit/pixel images is to eliminate some of its rows and columns. This is done by a nearest neighbor approximation: If the image has, for example, L rows and it is desired to eliminate n rows, every (L/n)th row is eliminated.

In practice, the image reduction can be performed as the blocks are moved. Two methods are suggested described by the following two sets of Equations which are modifications of Eqs. (1).

$$SX_{o,n+1} = SX_{0n}, \quad (2)$$

$$SY_{o,n+1} = SY_{o,n} + W + M(n + 1),$$

$$SX_{m+1,n} = SX_{mn} + W + M(m + 1),$$

$$SY_{m+1,n} = SY_{m,n}.$$

$$DX_{o,n+1} = DX_{0n} - A(n + 1),$$

$$DY_{o,n+1} = DY_{o,n} + W,$$

$$DX_{m+1,n} = DX_{mn} + W,$$

$$DY_{m+1,n} = DY_{m,n} + A(m + 1),$$

$$SX_{o,n+1} = SX_{0n}, \quad (3)$$

$$SY_{o,n+1} = SY_{o,n} + W,$$

$$SX_{m+1,n} = SX_{mn} + W,$$

$$SY_{m+1,n} = SY_{m,n}.$$

$$DX_{o,n+1} = DX_{0n} - A(n + 1),$$

$$DY_{o,n+1} = DY_{o,n} - W - M(n + 1),$$

$$DX_{m+1,n} = DX_{mn} + W - M(m + 1),$$

$$DY_{m+1,n} = DY_{m,n} + A(m + 1),$$

where M(k) has the value 1 or 0. To assign the values of M(k) an algorithm similar to the one described previously can be used.

```
Y ← N/2;
FOR i IN [1..Max] DO
Y ← Y + L;
IF Y > = Lm THEN {M [i] ← O; Y ← Y − N;}
ELSE M [i] ← 1;
ENDLOOP;
```

Equations (2) describe a method in which, as the blocks are transferred, some of the lines are skipped by incrementing the pointers to the original blocks by one additional pixel. That means that some of the lines and columns of pixels will not be transferred. With this method, for angles larger than about 26°, (which generate one pixel wide blocks) some entire blocks will not be transferred. This is taken into account when the A(k) array is generated.

Equations (3) describe a method in which all the blocks are transferred, but the destination coordinates of some blocks are incremented by one pixel less, so that the end result is an image of correct size. When A(k) is computed dH is replaced in the scaling algorithm by the displacement of the upper-right corner of the reduced image.

The second method can be used in two different modes. In the first mode, assumed implicitly in our discussion, as the blocks are transferred, any previous information in the region of the transferred block is overwritten. In this manner, when a block is transferred with a pointer for which M(k)≠0, the leftmost (or upmost) column (or row) of pixels overlaps another, already written block; the previously written information is replaced with the information of the last block.

For images containing mostly thin lines, assumed black on a white background, the reduction in the image size is implemented by the elimination of some rows and lines of pixels may cause the disappearance of some lines and an objectionable change in the width of some lines. To avoid this effect, a second mode of block transfer is used, in which the new information is "ORed" with the old. That is, the black pixels of the new block are added to the already existing black pixels from the previous block. This mode produces in some cases better, rotated images.

An additional problem caused by the method described is the fact that for every block transferred, the rotated image has, as shown in FIG. 3 by the designation p one pixel missing. For the normal (first) mode of operation, the problem can be avoided my making the dimensions of the transferred blocks, one pixel larger (W+1). For the "ORed" mode the same thing can be done with a resultant small amount of image degradation. Those pixels can be left unfilled, or can be filled with one of the neighboring pixels.

While there has been illustrated and described what is, at present, considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. A method of rotating a digital image defined by a matrix of pixels A×B an angle $\phi$ where tangent $\phi = h/A$ wherein h is a number such that both A and B are divisable by h including the steps of:
   a. Dividing the image into blocks of size a×b where a=A/h and b=B/h;
   b. Denote by i and j the columns and rows of a particular block with $0 \leq ij < A/h$;
   c. Displace the (i, j) block by i pixels in the vertical direction and by j pixels in the horizontal direction; wherein the improvement comprises the steps of:
   d. Scaling down the original image by a factor proportioned to cosine $\phi$; and
   e. Making each block in the original image at least one pixel wider to overlap with a neighbor block.

2. The method of claim 1, including the steps of denoting by A and A1, respectively, the width of the original and of the rotated image and letting dA=A1−A.

3. The method of claim 2 including the step of eliminating dA columns and dA lines of pixels, obtaining the correct size when for every h/dA block moved, sB and sL are incremented respectively by an additional pixel and line, where sB points to the upper left corner of the source block and sL points to the source line of blocks.

4. A method of rotating a source digital images defined by a plurality of blocks, each block having a plurality of pixels p and being a pixels wide and b pixels high, into a destination digital imaged defined by a plurality of blocks, each of the images s and d, forming lines of blocks, comprising the steps of:

a. Defining pointers sB, dB, sL, dL pointing, respectively, to the upper left corner of the source block, the destination block, the source line of blocks, and the destination line of blocks, b. Moving the source line of blocks one at a time to the destination line of blocks and incrementing sB by a pixel and incrementing dB by a pixel, and decrementing sL and dL by one line, c. Incrementing sL and dL by b lines and incrementing dL by one pixel after one line d blocks is rotated including the step of making the destination blocks a+1 pixels wide.

* * * * *